US006893038B2

(12) United States Patent
Egan

(10) Patent No.: US 6,893,038 B2
(45) Date of Patent: May 17, 2005

(54) MOTORCYCLE FOOT PEG WITH FOLDING HEEL REST

(75) Inventor: Craig P. Egan, Toronto (CA)

(73) Assignee: Kuryakyn Holdings, Inc., Somserset, WI (US)

(*) Notice: Subject to any disclaimer, the term of this patent is extended or adjusted under 35 U.S.C. 154(b) by 27 days.

(21) Appl. No.: 10/620,405

(22) Filed: Jul. 16, 2003

(65) Prior Publication Data

US 2005/0012300 A1 Jan. 20, 2005

(51) Int. Cl.[7] ................................................ G05G 1/14
(52) U.S. Cl. ...................................... 280/291; 74/564
(58) Field of Search ............................ 280/291; 74/564

(56) References Cited

U.S. PATENT DOCUMENTS

| | | | | |
|---|---|---|---|---|
| 3,960,027 A | * | 6/1976 | Magnuson | 74/594.6 |
| 4,458,910 A | * | 7/1984 | Stillwagon | 74/594.6 |
| 4,585,087 A | * | 4/1986 | Riccitelli | 180/230 |
| D338,643 S | | 8/1993 | Fuller et al. | D12/114 |
| 5,673,597 A | * | 10/1997 | Lin | 74/563 |
| D405,393 S | | 2/1999 | Stahel | D12/114 |
| 6,663,129 B1 | * | 12/2003 | Smith | 280/291 |
| 6,719,316 B1 | * | 4/2004 | Anthony | 280/291 |

FOREIGN PATENT DOCUMENTS

| | | | | |
|---|---|---|---|---|
| JP | 04278889 A | * | 10/1992 | B62J/25/00 |
| JP | 05016853 A | * | 1/1993 | B62J/25/00 |

OTHER PUBLICATIONS

Kuryakyn, Inc. 2001 Catalog, published Spring 2001, cover and pages 36, 37 and 40.

* cited by examiner

*Primary Examiner*—Kevin Hurley
(74) *Attorney, Agent, or Firm*—Westman, Champlin & Kelly, P.A.

(57) ABSTRACT

A motorcycle foot peg is made so that it can be supported onto the frame of a motorcycle in a location for forming a footrest. The foot peg includes a pivotable heel rest that has an arm pivotally mounted to the foot peg at one end with a lateral leg extending from the opposite end of the arm to cooperate to support a heel rest wall. The arm will pivot to a stored position so that the arm lies along, and preferably against a rear longitudinal edge of the foot peg. The arm has an integral lateral leg that is positioned across the outer end of the foot peg in the stored position. When the heel rest is pivoted to a working position, the arm extends out to the rear of the foot peg relative to a foot on the foot peg, and the heel support wall is positioned so the heel can be rested on the wall. In use, the heel rest will reduce fatigue and permit relaxation of the rider's feet and legs.

16 Claims, 3 Drawing Sheets

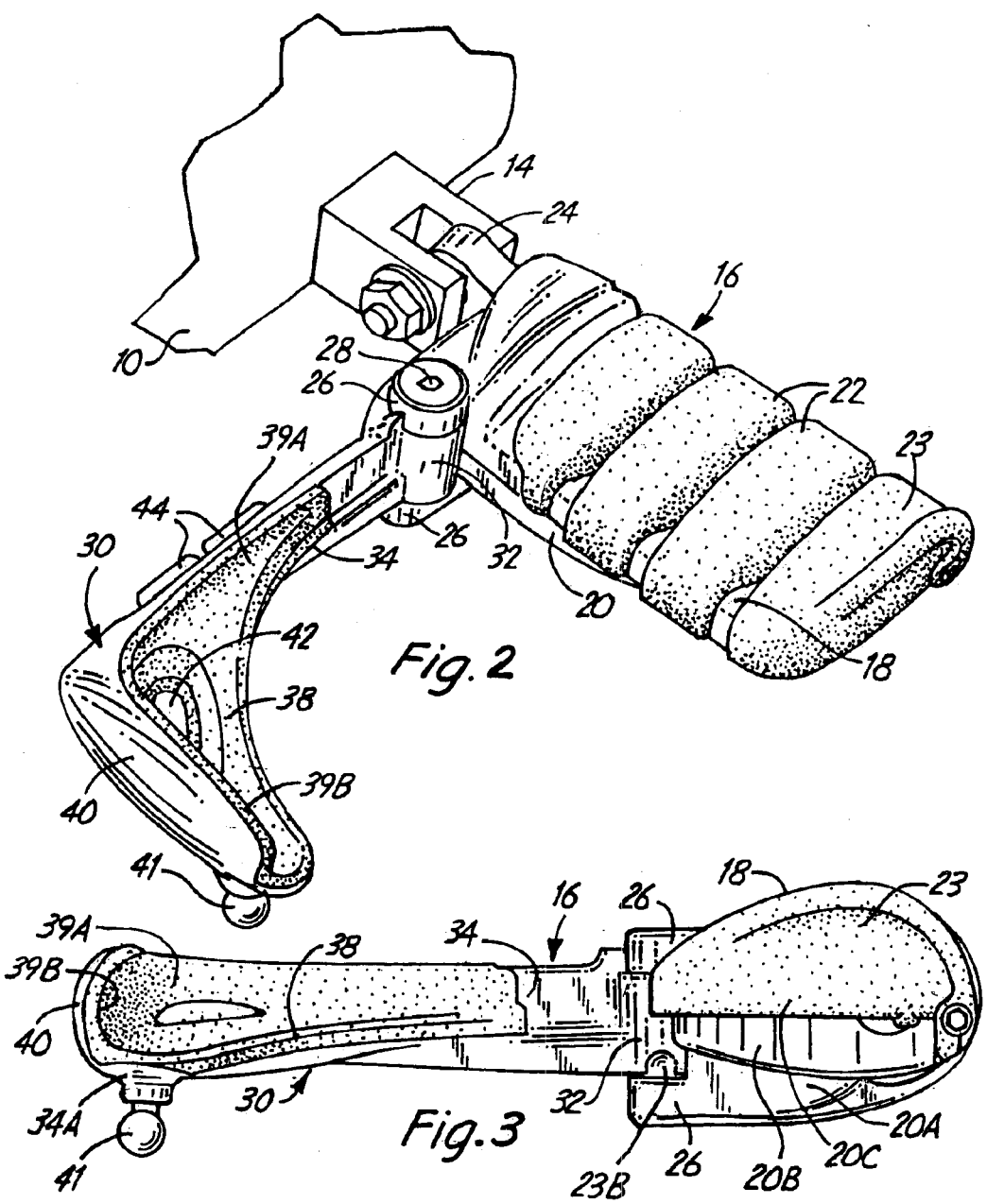
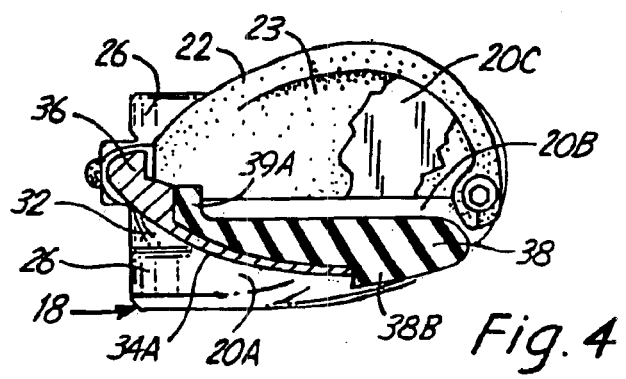

MOTORCYCLE FOOT PEG WITH FOLDING HEEL REST

BACKGROUND OF THE INVENTION

The present invention relates to a motorcycle foot rest or foot peg that has a heel rest that will pivot from a stored position rested against edges of the foot rest to a working position extended from the foot rest, to support the heel of a rider's foot on the foot peg.

In the past, various stirrups and foot pegs have been advanced for use with motorcycles to support the ball of a rider's foot.

Foot pegs with heel rests also have been used, but the existing heel rests are fixed in position relative to the foot peg itself, so that in instances where additional clearance is desired around the foot peg, or the heel rest is not wanted, the heel rests remain in the extended position.

SUMMARY OF THE INVENTION

The present invention relates to a foot peg for mounting onto a motorcycle frame, for supporting the feet of the rider or a passenger. The foot peg includes a heel rest comprising an arm having a heel support wall portion. The arm will fold up against edges of the foot peg when not in use. When pivoted out to the usable or working position, a support surface is positioned so a heel of the rider's foot can be placed on the support while the ball or other portions of the foot are on the foot peg itself.

The folding heel rests will work in any foot peg location, but they are ideal for motorcycles that have forward controls, or forward-mounted cruise pegs or "highway" pegs.

In the folded compact mode, the heel rest folds against the rear edge and outer end edge of the foot peg so that the heel rest is out of the way, and the exposed surfaces of the heel rest add a decorative appearance to the foot peg. The wall that supports the heel fits under the foot peg, so it is completely hidden and out of the way. The heel rest arm pivots easily to its usable position, so that when a person has the ball of the foot on the foot peg, the heel of that foot will rest on a surface that is supported on an arm pivoted to the foot peg. The support for the heel reduces fatigue and increases rider comfort.

The foot pegs are easily installed on any suitable support on a motorcycle frame or on an accessory bar or bracket. The foldability increases the versatility of foot supports or pegs on a motorcycle.

BRIEF DESCRIPTION OF THE DRAWINGS

FIG. 2 is a perspective view of the foot peg of the present invention showing the heel rest in its deployed or usable working position;

FIG. 3 is an outer end view of the foot peg shown in FIG. 1;

FIG. 4 is an outer end view of the foot peg with the heel rest in folded or stored position with an end leg broken away;

DETAILED DESCRIPTION OF THE ILLUSTRATIVE EMBODIMENTS

Figure 1:
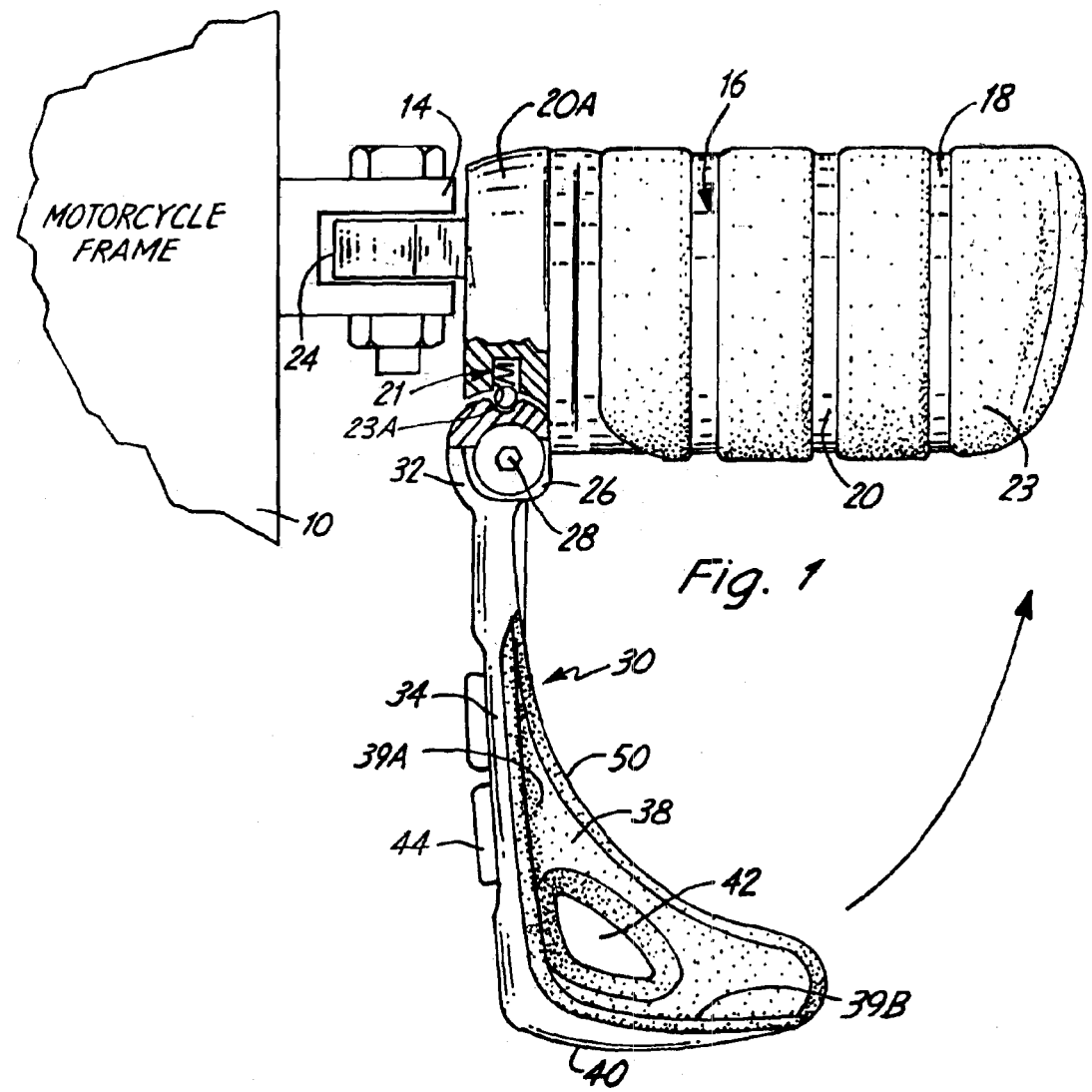
FIG. 1 is a top plan view of a foot peg made according to the present invention installed on a fragmentary schematic representation of a mounting bar of a motorcycle frame.

In FIGS. 1 and 2, the illustration of a motorcycle frame member 10 is for illustrative purposes, and is shown only schematically. In the form shown in FIG. 1, for illustrative purposes for showing a mounting of the present invention, bracket 14 is supported on the frame 10, and a foot peg assembly 16 is held on the bracket 14. If desired the bracket 14 can be attached to the highway cruise bar that extends across the motorcycle frame. The foot peg assembly 16 is bolted or otherwise mounted on bracket 14.

The foot peg assembly 16 is shown in more detail in FIGS. 2 through 6, and includes a foot support peg 18, that, as shown, has a metal frame 20, and elastomeric material vibration isolation and friction strips 22 spaced along the upper surface. In addition, an elastomeric end cap 23 is positioned over an outer end of the metal frame 20. The strips 22 and end cap 23 are held in place in a suitable manner. The foot peg frame 20 has a mounting ear 24 that is used for attaching the foot peg to the bracket 14 on cruise bar 12, or an other frame bracket on a motorcycle, with a suitable bolt, cap screw or other fastener.

A separate foot peg assembly 16 extends laterally out from the motorcycle frame on both sides, and each foot peg assembly is in position to support a foot of a rider of the motorcycle when rider is not engaged in shifting or the like. The foot peg 18 is of suitable size for supporting the foot.

The foot peg assembly 16 of the present invention has an inner end flange 20A that supports vertically spaced hubs 26 on an inner, rear side of the foot peg frame 20. The spaced hubs 26 receive a hub 32 of a heel rest assembly 30. The hub 32 fits between the hubs 26, and a pivot pin 28 is used for pivotally mounting the heel rest assembly to the frame 20 of the foot rest peg 18 about the pivot axis of pin 28. The heel rest assembly 30 is part of the foot peg assembly 16. The inner end flange 20A has a spring loaded detent 21 shown schematically in FIG. 1 where a portion of the flange 20A is broken away. The detent 21 will engage detent recesses 23A and 23B in the hub 26 to retain heel rest assembly in working position shown in FIG. 1 and a folded position of FIG. 5.

The heel rest assembly 30 has an elongated support arm 34 extending from hub 32, which is of length and shape so that when it is extended rearwardly out from the foot peg, a wall portion 38 that is supported on the arm 34 will be positioned to support the heel of a boot or shoe on the foot peg. The arm has an inwardly extending flange 34A (see FIG. 3) that is under and supports the bottom of wall portion 38.

A laterally extending leg 40 is integral with the arm 34 and extends perpendicular to arm 34 and supports the outer or base end of wall portion 38. The leg 40 extends upwardly from above the wall 38 as does the arm 34 to form an open sided cup. The wall portion 38 also can have a flange 39A that extends upwardly along the inner surface of arm 34 and a flange 39B that extends upwardly along the inner surface of laterally extending leg 40. The leg 40 forms a stop or barrier to keep the heel from slipping off the wall 38. The arm 34 wall portion 38 and leg 40 are rounded and shaped to provide a pleasing appearance.

The heel rest wall portion 38 has an opening 42 adjacent to the corner where arm 34 and leg 40 meet, so that dirt, rocks and other material will not build up in that corner.

A replaceable, ball ended peg 41 is threaded into a threaded bore or receptacle on the underside of the leg 40 at the outer end of leg 40 and the flange 34A. Thus peg 41 is a "grind peg" that will protect folding arm 34 and leg 40 from abrasion when or if the motorcycle is leaned over during a turn. The peg 41 can be replaced from time to time if worn.

Normally, the pivot axis of the pivot 28 is oriented relative to a central longitudinal plane of the foot peg defined by the front and rear longitudinal edges so that when the foot pegs are mounted on a bracket 14 with ear 24, the heel rest arm 34 inclines downwardly. In other words, the rear part of heel rest wall portion 38 and lateral leg 40 would be lower than the foot peg 18. The ball or instep of the foot of a rider rests on the peg 18.

Figure 5:
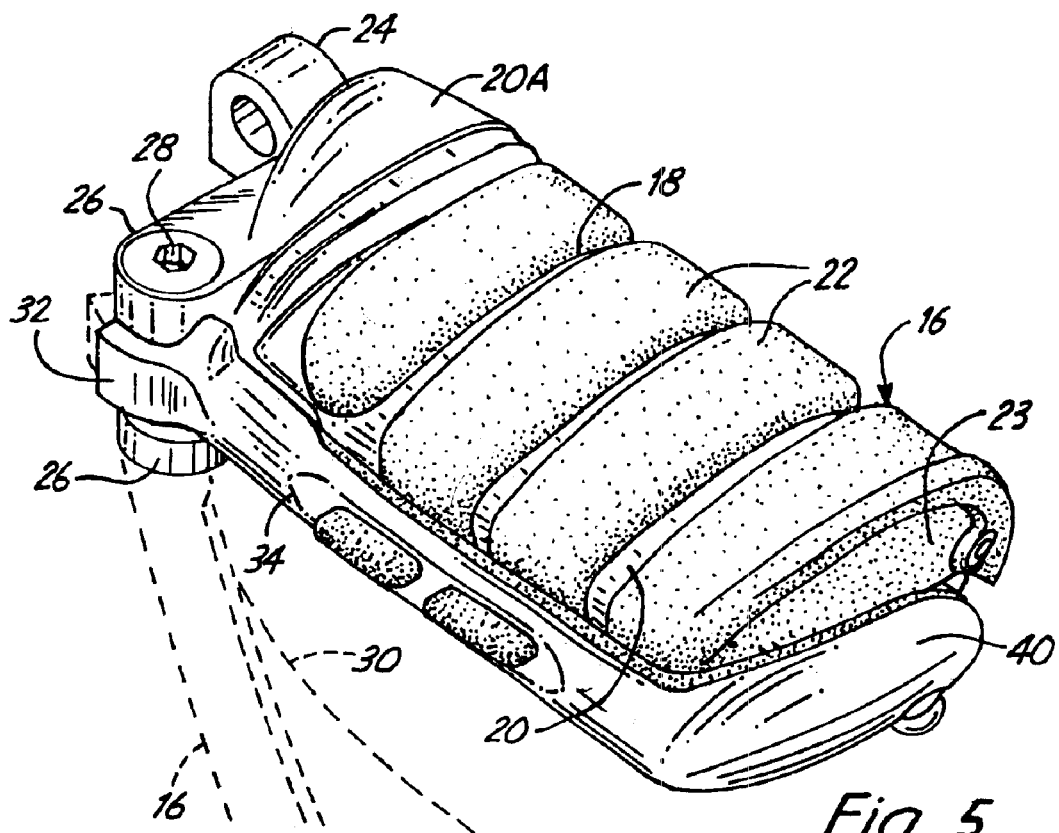
FIG. 5 is a perspective view of the foot peg shown in FIG. 1 with the heel rest in its folded or stored position, with the heel rest is folded against edges of the foot peg.
Figure 6:
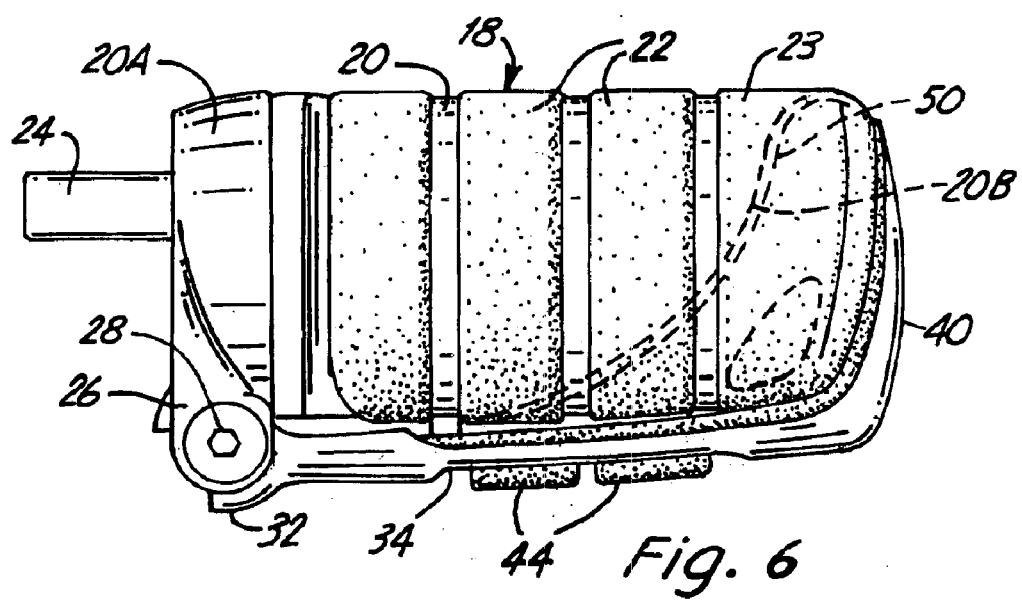
FIG. 6 is a top plan view of the foot peg with the heel rest in the stored position.

The heel rest arm 34 also can have decorative and protective ribs 44 mounted on the outer side thereof. The heel rest arm 34, wall 38 and leg 40 will pivot to a closed or stored position, as shown in FIGS. 4–6. This forms a very compact foot support when the heel rest is not used.

When folded, the arm 34 extends along a rear longitudinal length edge of the foot peg 18, and leg 40 fits along the outer side edge. The frame 20 is configured to accommodate the heel rest wall 38 when the heel rest assembly is pivoted to the stored position. The heel rest wall 38 slides under the outer and rear end 20C of the frame 20 of footrest 18 as shown in FIG. 4, where leg 40 and flange 39 are broken away at the inner edge of flange 39B. The support flange 34A is shown in cross section in FIG. 4. Flange 34A has an opening so a portion 38B of the heel rest wall 38 surrounding opening 42 protrudes down. The arm 34 and leg 40 are contoured on their outer surfaces so the foot peg assembly looks finished and attractive when the heel rest is folded to the stored position. The surface of the arm 34 that is visible along the back edge of the foot peg provides a decorative, streamlined, finished look, as does the leg 40 when in its stored or folded position. The leg 40 blends in with the frame 20 and end covering of the foot peg. The heel rest is retained in folded position with the detent 21 and access 23B until it is manually pivoted to the working position.

The feature of being able to pivot the heel rest from a stored or folded position (FIGS. 4, 5 and 6) where the heel rest wall is substantially concealed and out of the way, to a working or usable position 90° from its stored position for use as a heel rest (FIGS. 1–3) increases the usefulness of the foot peg or footrest. The folded heel rest arm 34 extends along the rear edge of the foot peg and the leg 40 fits around the outer end of the foot peg, as shown, so the entire heel rest is well concealed and looks as if it is just the finishing touch on the foot peg. The heel rest is highly usable in its opened or deployed position as shown in FIGS. 1–3.

The size of the heel rest wall portion 38 can be varied, but as shown, it is generally adequate to have it only partially extend along the arm 34 from leg 40 toward the pivot pin 28. The heel rest wall 38 does have a curved inner edge 50. Adequate surface area for supporting the heel is maintained. The heel rest wall 38 can be made of a synthetic material, and can have a non-skid surface if desired. The heel of a rider's shoe or boot is cradled by the arm 40 and arm 34 as it rests on heel rest wall 38.

Although the present invention has been described with reference to preferred embodiments, workers skilled in the art will recognize that changes may be made in form and detail without departing from the spirit and scope of the invention.

What is claimed is:

1. A foot peg and heel rest, for supporting a foot of a rider of a motorcycle, comprising:

a foot support peg;

a bracket, for supporting the foot support peg relative to a frame of a motorcycle;

a heel rest, including an elongated heel rest arm, and a laterally extending heel rest wall fixed to the heel rest arm, for supporting a heel of a foot when the heel rest arm is in a working position with the arm extending from the foot support peg, the laterally extending heel rest wall in alignment with and extending away from the foot support peg in the working position; and a pivot connection whereby the heel rest arm is pivotally mounted relative to the foot support peg about an axis positioned to permit the heel rest arm to be moved from the working position to a stored position with the heel rest arm extending along and adjacent an edge of the foot support peg.

2. The foot peg and heel rest of claim 1, wherein said heel rest arm has a leg extending laterally from the heel rest arm at an end of the heel rest arm opposite from the pivot, and wherein the heel rest arm is of length to extend such that the leg fits adjacent an end of the foot support member when the heel rest arm is in the stored position.

3. The foot peg and heel rest of claim 2, wherein said foot support peg has a plurality of elastomeric isolating material strips along an upper surface thereof.

4. The foot and heel rest of claim 2, wherein a portion of said heel rest wall is secured to the laterally extending leg.

5. The foot and heel rest of claim 4, wherein flanges extend upwardly from the heel rest wall along the heel rest arm and the laterally extending leg.

6. The foot and heel rest of claim 1, wherein said heel rest arm is a metal arm, and a laterally extending leg integral with the metal arm, said heel rest wall being attached to the metal arm and to the laterally extending leg and positioned adjacent a corner formed between the metal arm and the laterally extending leg.

7. The foot and heel rest of claim 6, wherein said heel rest wall has an opening therethrough adjacent the corner between the heel rest arm and the laterally extending leg.

8. The foot and heel rest of claim 2, wherein the heel rest wall is positioned under the foot support peg when the heel rest arm is in the stored position.

9. The foot and heel rest of claim 2, wherein the heel rest arm extends along a rear edge of the foot support peg when the heel rest arm is in its stored position, and wherein the bracket extends from a first end of the foot support peg proximate the motorcycle frame, toward the rear edge of the foot support peg.

10. A foot peg for mounting onto a motorcycle frame combined with a heel rest, said foot peg having a longitudinal length between first and second ends of the foot peg, the first and second ends having a width between longitudinal edges of the foot peg, a mounting ear at the first end of the foot peg and the heel rest pivotally mounted to the foot peg at a pivot adjacent the first end of the foot peg, said heel rest comprising an arm pivotally mounted to the foot peg about an axis generally perpendicular to a longitudinal plane of the foot peg, and the arm having a length substantially equal to the longitudinal length of the foot peg between the pivot and the second end, a lateral leg attached to an end of the arm opposite from the pivot, and a heel rest wall supported on the arm and the lateral leg at a location spaced from the foot peg when the arm is in a working position extending generally perpendicular to the longitudinal edges of the foot peg.

11. The foot peg of claim 10, wherein said heel rest is pivotable to a stored position with the arm extending generally along and adjacent one of the longitudinal edges of the foot peg, the lateral leg extending along and to the exterior of the second end of the foot peg.

12. The foot peg of claim 11, wherein the heel rest wall is mounted at lower edges of the arm and lateral leg such that the heel rest wall is positioned below the foot peg when the heel rest is in a stored position.

13. The foot peg of claim 12, wherein the foot peg has a frame, the frame having a recess on a lower side, the heel rest wall being received in the recess when the heel rest is in the stored position.

14. The foot peg of claim 11, wherein the heel rest wall is mounted at lower edges of the arm and a lateral wall, the lateral wall forming a stop for a heel on the heel support wall.

15. The foot peg of claim 11, further comprising a bracket on the foot peg for mounting the foot peg on a support, and wherein an axis of the pivot of the arm is positioned relative to the bracket so the arm extends downwardly from the foot peg in direction toward the lateral leg when the bracket is mounted on a support.

16. A foot peg and heel rest, for supporting a foot of a rider of a motorcycle, comprising:

a foot support peg;

a bracket, for supporting the foot support peg relative to a frame of a motorcycle;

a heel rest, including an elongated heel rest arm, and a laterally extending heel rest wall fixed to the heel rest arm, for supporting a heel of a foot when the heel rest is in a working position with the arm extending from the foot support peg, the laterally extending heel rest wall in alignment with and extending away from the foot support peg in the working position; and a pivot connection whereby the heel rest arm is pivotally mounted relative to the foot support peg about an axis positioned to permit the heel rest arm to be moved from the working position to a stored position with the heel rest arm extending along and adjacent an edge of the foot support peg;

wherein said heel rest arm has a leg extending laterally from the heel rest arm at an end of the heel rest arm opposite from the pivot connection;

wherein the heel rest arm is of length to extend such that the leg fits adjacent an end of the foot support member when the heel rest arm is in the stored position;

wherein a portion of said heel rest wall is secured to the lateral extending leg; and wherein flanges extend upwardly from the heel rest wall along the heel rest arm and the laterally extending leg.

\* \* \* \* \*